US006697954B1

(12) United States Patent
Stufflebeam

(10) Patent No.: US 6,697,954 B1
(45) Date of Patent: Feb. 24, 2004

(54) METHOD/APPARATUS FOR PRESERVING STATE OF AN EVENT DURING POWERUP RESET SEQUENCE BASED ON STATE OF AN EVENT SIGNAL IMMEDIATELY PRIOR TO THE RESET

(75) Inventor: Kenneth W. Stufflebeam, Spring, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/227,348

(22) Filed: Jan. 8, 1999

(51) Int. Cl.[7] .............. G06F 1/24; G06F 1/28; G06F 1/30; G06F 1/32
(52) U.S. Cl. .......... 713/330; 710/14; 710/19; 710/131; 712/228; 712/229; 713/300; 713/324
(58) Field of Search .......... 710/14, 19, 131; 712/228, 229; 713/300, 324, 330

(56) References Cited

U.S. PATENT DOCUMENTS

| 3,699,535 | A | * | 10/1972 | Klein | 711/137 |
|---|---|---|---|---|---|
| 4,298,934 | A | * | 11/1981 | Fischer | 711/152 |
| 4,388,695 | A | * | 6/1983 | Heinemann | 711/163 |
| 4,631,659 | A | * | 12/1986 | Hayn, II et al. | 364/200 |
| 4,651,323 | A | * | 3/1987 | Goodman et al. | 714/8 |
| 5,375,246 | A | * | 12/1994 | Kimura et al. | 395/750 |
| 5,461,649 | A | * | 10/1995 | Bailey et al. | 327/28 |
| 5,572,718 | A | * | 11/1996 | Scriber et al. | 395/555 |
| 5,577,220 | A | * | 11/1996 | Combs et al. | 395/416 |
| 5,590,343 | A | * | 12/1996 | Bolan et al. | 395/750 |
| 5,630,090 | A | * | 5/1997 | Keehn et al. | 395/433 |
| 5,809,223 | A | * | 9/1998 | Lee et al. | 395/182.02 |
| 5,884,084 | A | * | 3/1999 | Nelson et al. | 395/750.01 |
| 5,935,253 | A | * | 8/1999 | Conary et al. | 713/322 |
| 5,938,728 | A | * | 8/1999 | Dwork et al. | 709/222 |

* cited by examiner

Primary Examiner—Thomas Lee
Assistant Examiner—Tanh Nguyen
(74) Attorney, Agent, or Firm—Akin, Gump, Strauss, Hauer & Feld, LLP

(57) ABSTRACT

Context or other functional settings are protected during a power up reset sequence in a computer system, without the need to save such context or settings in static memory. A signal, representing a change in the context, is delayed beyond a critical period of indeterminacy resulting from a power up sequence. Reliable signals, set before an application of power, negotiate the delay prior to an assertion of a power up reset signal. The context or settings are preserved by bypassing the reset signal. Unreliable signals, set during an application of power, are held by the delay to allow the reset signal to clear or initialize the context or settings. The reset function operates without prior knowledge, for example as saved in static memory, of the state of the context.

11 Claims, 3 Drawing Sheets

METHOD/APPARATUS FOR PRESERVING STATE OF AN EVENT DURING POWERUP RESET SEQUENCE BASED ON STATE OF AN EVENT SIGNAL IMMEDIATELY PRIOR TO THE RESET

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

The present invention relates to a computer system having reset capabilities and more specifically to saving a particular state upon application of a reset during a wake up from a reduced power consumption state.

2. Description of the Related Art

The popularity of notebook computers and similar mobile devices that rely on battery provided power has led to the ever-increasing concern to maximize battery life. To meet this challenge, a number of power management protocols have been developed for various PC platforms. Among the most popular of these platforms is the PCI local bus. Since its introduction in 1993, PCI has gained wide acceptance in the mobile computer environment. The PCI local bus supports power management functionality. This is done in part by defining four distinct power states and by providing an interface for controlling these states. These states define distinct power saving levels, ranging from normal power operation to deep sleep operation. The PCI power management interface provides power status reporting, sets the power states, and performs system wake up calls.

A PCI device or more correctly, a PCI function within that device can request a change of its power consumption state by generating a power management event (PME). This PME is represented by a PME signal, asserted by the device. The PME signal will request either a change from a power saving state, or sleep state, to a fully operational state or vise versa. A device function also generates what is called a function context. The function context includes not only the status of the function but also all the information that is required to perform that function. For example, the PME context includes all the functional state information and logic required to generate power management events, report PME status and enable PMEs. Therefore, under the PCI power management protocol, a device may request a change in a power consumption state by issuing a PME signal. When a device's PCI function generates or detects an event that requires the system to change its power state, the function will assert a PME signal.

Some devices that are powered by a battery or some other external power source may use a PME signal even when powered off. Such devices, however, have the added requirement of maintaining the value of the status of the PME context. Specifically, the PCI local bus requirement states that PME context must be preserved over a power cycle and the associated power on reset. In this way, many of the bits associated with the PME context are defined to be sticky bits, in that their states are not affected by the power on reset or transition from a low power consumption to a higher power consumption state. This is because the device function's PME functionality itself may have been responsible for the wake event that caused the transition to the different power consumption state. In this way, the PME context must be preserved for the system software to process. Thus, traditionally, prior knowledge of the state of the PME was required to ensure a request or detection was reliable. This was generally accomplished either by applying a battery back up to the device or saving the PME context in a non-volatile device.

Upon a change to a different power consumption state, a reset signal is applied to the device to initialize selected signals and registers. The reset signal is used to bring PCI-specific registers, including the PME context, to a consistent state after an indeterminate period, during which signals may have been erroneously altered. Specifically, during an exit from a sleep state, the application of power to a device may alter the status of the PME context. However, in the traditional system, the PME context will have been saved in non-volatile memory or have been directly backed up by a battery. This saved PME context is then compared to the present state of the PME context to determine if unwanted alterations have occurred. In either case, the prior state of the PME context is required to ensure subsequent system operation.

SUMMARY OF THE INVENTION

The present invention provides a computer system capable of protecting context or settings during a power up reset sequence. This is done without the need to save them in ROM or other static memory device. The event signals, representing the context or settings, are provided to a device which delays the timing of the event signal for a specified time. The delayed event signal and a power on reset signal are compared to determine whether the context or settings are reliable. If reliable the context or settings are protected from the reset signal, saving their present state. If determined to be suspect or unreliable, the reset signal is applied to initialize the context or settings.

A delay circuit in the computer system creates a time lag in the event signal. Because the reset signal is asserted a minimum time from a power on sequence, the delayed event signal corresponds to the reset signal if the event signal was the errant result of the power on sequence. However, if the event signal was set prior to the application of power, the delay will have been negotiated prior to the assertion of the reset signal. Therefore two paths are provided for a power on reset signal. One path, when the event signal and the reset signal correspond, causes the context or settings to be initialized or cleared by the reset signal. The second path, where the event signal was set prior to the application of power, allows the reset signal to bypass the context or settings, thereby saving their present state.

In this way, reliability of the settings or context information is determined without prior knowledge of their state. Furthermore, the present settings or context information is saved, when reliable, without the use of external memory or battery backups.

DETAILED DESCRIPTION OF INVENTION

COMPUTER SYSTEM OVERVIEW

Figure 1:
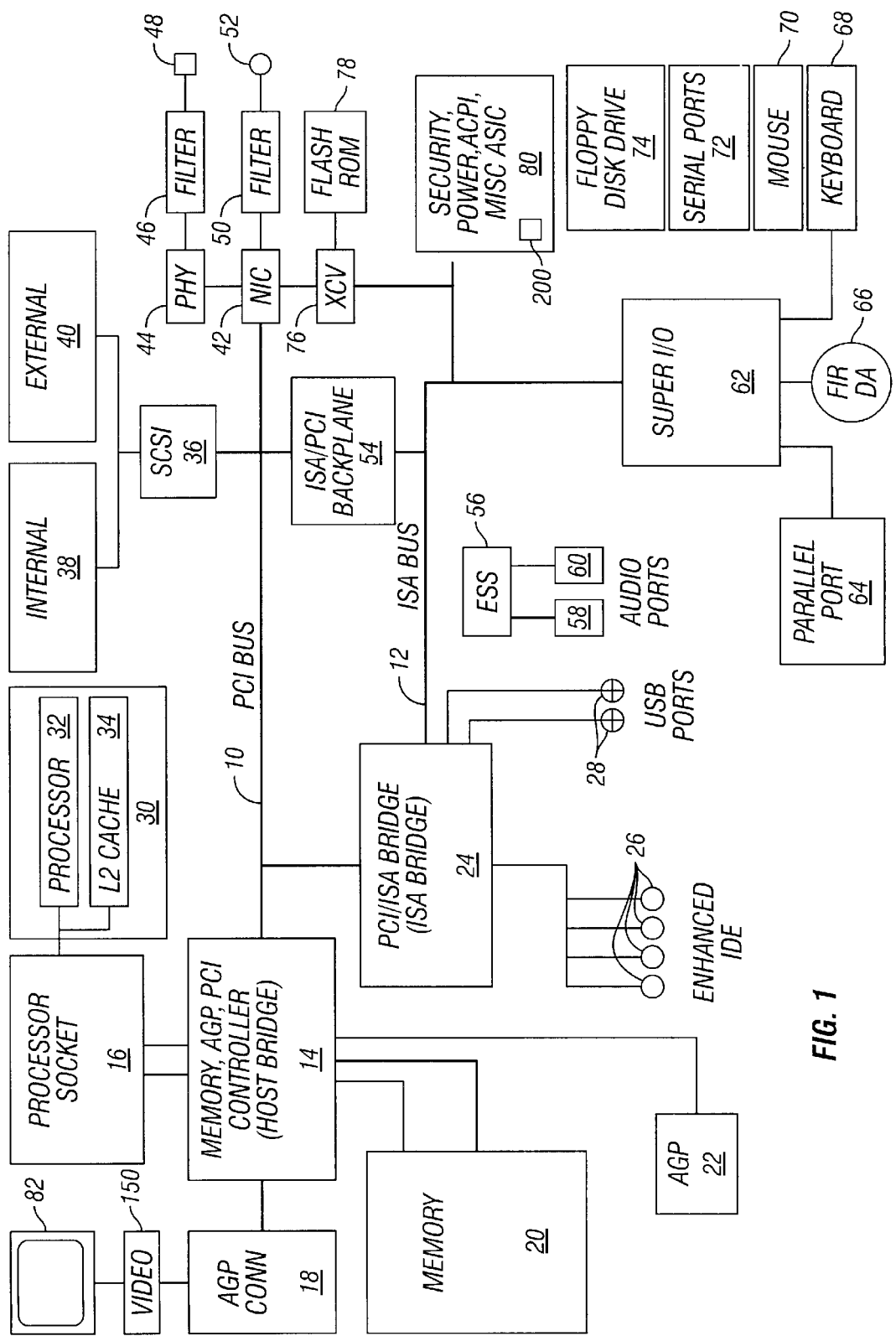
FIG. 1 is a schematic electrical circuit diagram of a computer system according to the present invention

Turning to FIG. 1, illustrated is a typical computer system S implemented according to the invention. While this system is illustrative of one embodiment, the techniques according to the invention can be implemented in a wide variety of systems. The computer system S in the illustrated embodiment is a PCI bus/ISA bus based machine, having a peripheral component interconnect (PCI) bus 10 and an industry standard architecture (ISA) bus 12. The PCI bus 10 is controlled by PCI controller circuitry located within a memory/accelerated graphics port (AGP)/PCI controller 14. This controller 14 (the "host bridge") couples the PCI bus 10 to a processor socket 16 via a host bus, an AGP connector 18, a memory subsystem 20, and an AGP 22. A second bridge circuit, a PCI/ISA bridge 24 (the "ISA bridge") bridges between the PCI bus 10 and the ISA bus 12.

The host bridge 14 in the disclosed embodiment is a 440LX Integrated Circuit by Intel Corporation, also known as the PCI AGP Controller (PAC). The ISA bridge 24 is a PIIX4, also by Intel Corporation. The host bridge 14 and ISA bridge 24 provide capabilities other than bridging between the processor socket 16 and the PCI bus 10, and the PCI bus 10 and the ISA bus 12. Specifically, the disclosed host bridge 14 includes interface circuitry for the AGP connector 18, the memory subsystem 20, and the AGP 22. The ISA bridge 24 further includes an internal enhanced IDE controller for controlling up to four enhanced IDE drives 26, and a universal serial bus (USB) controller for controlling USB ports 28.

The host bridge 14 is preferably coupled to the processor socket 16, which is preferably designed to receive a Pentium II processor module 30, which in turn includes a microprocessor core 32 and a level two (L2) cache 34. The processor socket 16 could be replaced with different processors other than the Pentium II without detracting from the spirit of the invention.

The host bridge 14, when the Intel 440LX Host bridge is employed, supports extended data out (EDO) dynamic random access memory (DRAM) and synchronous DRAM (SDRAM), a 64/72-bit data path memory, a maximum memory capacity of one gigabyte, dual inline memory module (DIMM) presence detect, eight row address strobe (RAS) lines, error correcting code (ECC) with single and multiple bit error detection, read-around-write with host for PCI reads, and 3.3 volt DRAMs. The host bridge 14 support up to 66 megahertz DRAMs, whereas the processor socket 16 can support various integral and nonintegral multiples of that speed.

The ISA bridge 24 also includes enhanced power management. It supports a PCI bus at 30 or 33 megahertz and an ISA bus 12 at ¼ of the PCI bus frequency. PCI revision 2.1 is supported with both positive and subtractive decode. The standard personal computer input/output (I/O) functions are supported, including a dynamic memory access (DMA) controller, two 82C59 interrupt controllers, an 8254 timer, a real time clock (RTC) with a 256 byte complementary metal oxide semiconductor (CMOS) static RAM (SRAM), and chip selects for system read only memory (ROM), real time clock (RTC), keyboard controller, an external microcontroller, and two general purpose devices. The enhanced power management within the ISA bridge 24 includes full clock control, device management, suspend and resume logic, advanced configuration and power interface (ACPI), and system management bus (SMBus) control, which implement the inter-integrated circuit ($I^2C$) protocol.

The PCI bus 10 couples a variety of devices that generally take advantage of a high-speed data path. This includes a small computer system interface (SCSI) controller 26, with both an internal port 38 and an external port 40. In the disclosed embodiment, the SCSI controller 26 is an AIC-7860 SCSI controller. Also coupled to the PCI bus 10 is a network interface controller (NIC) 42, which preferably supports the ThunderLan$^{TN}$ power management specification by Texas Instruments. The NIC 42 is coupled through a physical layer 44 and a filter 46 to an RJ-45 jack 48, and through a filter 50 to an AUI jack 52.

Between the PCI Bus 10 and the ISA Bus 12, an ISA/PCI backplane 54 is provided which include a number of PCI and ISA slots. This allows ISA cards or PCI cards to be installed into the system for added functionality.

Further coupled to the ISA Bus 12 is an enhanced sound system chip (ESS) 56, which provides sound management through an audio in port 58 and an audio out port 60. The ISA bus 12 also couples the ISA bridge 24 to a Super I/O chip 62, which in the disclosed embodiment is a National Semiconductor Corporation PC87307VUL device. This Super I/O chip 62 provides a variety of input/output functionality, including a parallel port 64, an infrared port 66, a keyboard controller for a keyboard 68, a mouse port for a mouse port 70, additional series ports 72, and a floppy disk drive controller for a floppy disk drive 74. These devices are coupled through connectors to the Super I/O 62.

The ISA bus 12 is also coupled through bus transceivers 76 to a flash ROM 78, which can include both basic input/output system (BIOS) code for execution by the processor 32, as well as an additional code for execution by microcontrollers in a ROM-sharing arrangement.

The ISA bus 12 further couples the ISA bridge 24 to a security, power, ACPI, and miscellaneous application specific integrated circuit (ASIC) 80, which provides a variety of miscellaneous functions for the system. The ASIC 80 includes security features, system power control, light emitting diode (LED) control, a PCI arbiter, remote wake up logic, system fan control, hood lock control, ACPI registers and support, system temperature control, and various glue logic. According to the present invention, the ASIC 80 further includes a context save circuit 200. The context save circuit 200 contains an event context register 202 (FIG. 2) which contains status information for certain system occurrences, for example changes in a power consumption state. The circuit 200 also receives as an input from the system bus 10, a reset signal and operates as an intelligent buffer between reset signal and the event context register 202. The event context register 202 is reset only upon certain conditions. The context save circuit 200 independently controls application of the reset signal to the event context register 202.

Finally, a video display 82 can be coupled to the AGP connector 18 through an AGP master or video card 150 for display of data by the computer system S. The video display 82 displays video and graphics data provided by a video display process running on either the processor module 30 or another by a PCI device bus master or PCI bridge device bus master via host bridge 14. Video or graphics data may be stored in main memory or in a supplementary or extension memory module. Again, a wide variety of systems could be used instead of the disclosed system S without detracting from the spirit of the invention.

EVENT CONTEXT SAVE CIRCUIT

Figure 2:
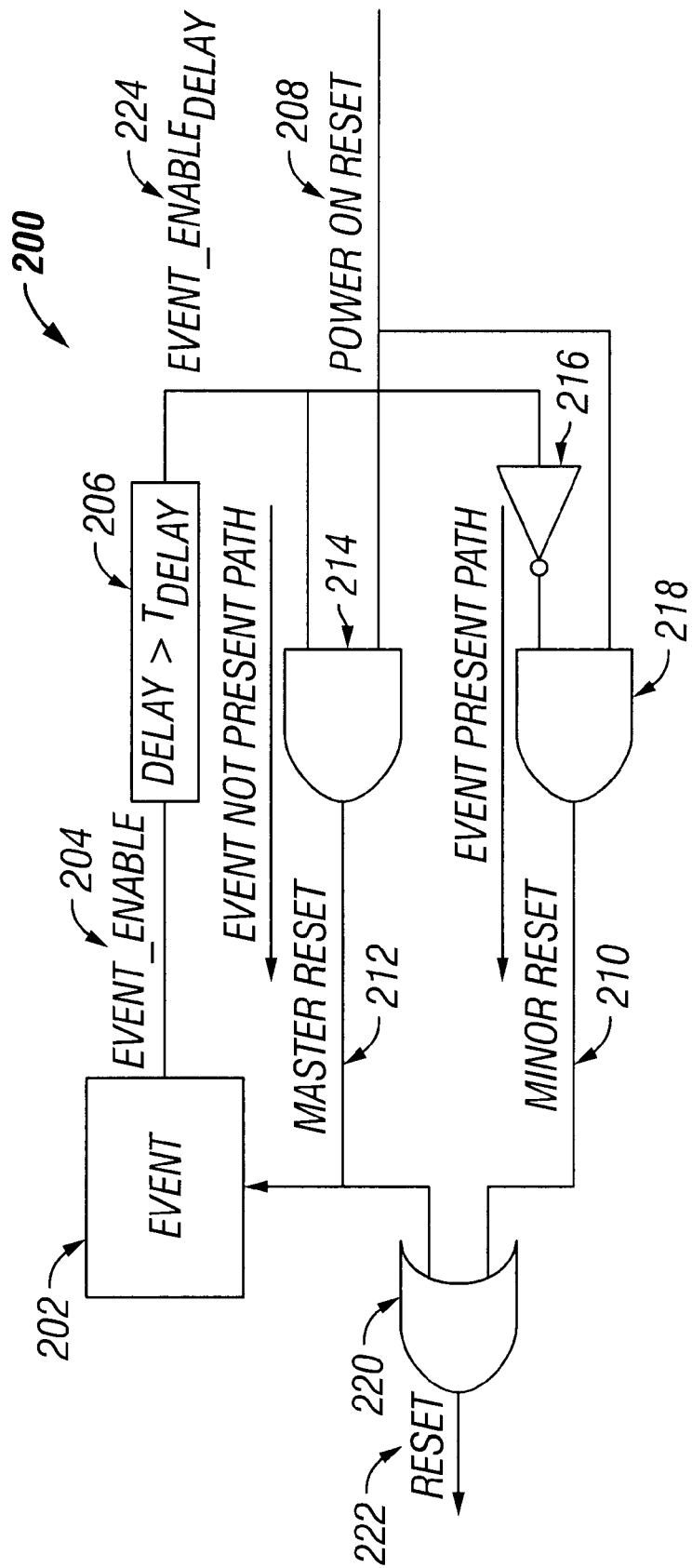
FIG. 2 is a schematic of a context save circuit in the computer system of FIG. 1.

Turning now to FIG. 2, illustrated is a detailed schematic of the context save circuit 200, shown in FIG. 1 as part of the ASIC 80. The context save circuit 200 is generally comprised of a delay circuit 206 and a set of logical steering gates 214–220. According to the illustrated embodiment, an event register 202 is either reset by a reset signal, illustrated as a master reset signal 212, or is preserved by bypassing the reset signal, illustrated as a minor reset signal 210, around the event register 202. The event register 202 is a packet of information that, for example, includes the context or settings required to generate certain events. The event register 202 further includes an Event_Enable signal 204, an active low signal which operates to indicate that an event has occurred. In one embodiment, the Event_Enable signal 204 may represent a system request to change the power consumption state, for example exiting from a sleep mode.

It should be understood that the active levels for the various signals are defined using "high" and "low" terminology for exemplary purposes only. The present invention, however, is not constrained by a particular sense of the signals.

Generally, the context save circuit 200 provides two scenarios, discussed in more detail below. First, if the Event_Enable signal 204 starts at the same time as power is applied, which constitutes an extraneous or unreliable signal event, it won't make it through the delay circuit in time to steer the reset to the errant minor reset path 210, thus the correct master reset path 212 will be taken. If, on the other hand, the Event_Enable signal 204 is true and proper, it will have already negotiated the delay 206 and be present on the AND gates 214 and 218 and properly steer the reset signal 208 to the proper minor reset path 210.

From the event register 202, the Event_Enable signal 204 is passed through a delay circuit 206. The delay circuit 206 holds the Event_Enable signal 204 for a predetermined period of time resulting in an Event_Enable$_{Delay}$ signal 224. A Power_On_Reset signal 208 is applied to the context save circuit 200. The Power_On_Reset signal 208 can be a system wide reset signal, originating from the processor 32. For example, the Power_On_Reset signal 208 may be asserted upon exit from a sleep state, initializing system devices such as the monitor, hard drives, and other peripherals. The context save circuit 200 provides a reset signal with two alternative paths. A first path is taken when an event has either not occurred, was erroneously set or was set during an indeterminate period such as during a power on operation. Along this path, the reset signal is able to clear the bits that were erroneously set. Alternatively, when a reliable event has occurred, for example, prior to a power on operation, a second path is provided through which the reset signal can bypass the event settings, leaving them in an unaltered state. In either case, the reset signal is passed through the context save circuit 200 to be applied to other system devices.

The Power_On_Reset signal 208 along with the Event_Enable$_{Delay}$ signal 224 are presented to a first AND gate 214. When both the signals are at high signal levels, the first AND gate 214 sets the Master_Reset signal 212. As an active high signal, the Master_Reset signal 212 then operates to reset or initialize the status of the event register 202 and its contents. Therefore, when the Event_Enable$_{Delay}$ signal 224 corresponds with an active Power_On_Reset signal 208, the Master_Reset signal 212 is set and then resets or initializes the contents of the event register 202. In this way, when an unreliable event has occurred, the context save circuit 200 passes the reset signal along the "event not present" path, through the first AND gate 214. Consequently, the Master_Reset signal 212 is set and the event register 202 is initialized.

The "event not present" path conductor represents a situation where no event has occurred. Alternatively, this path is taken by a reset signal where an unreliable event has occurred, for example the contents of the event register 202 may be corrupted during a system power on operation.

Alternatively, the contents of the event register 202 can be preserved when a reliable event has occurred. The event register 202 is bypassed by a reset signal, as the Master_Reset signal 212 is not set, discussed in more detail with reference to FIG. 3B. In the present invention, an event of some type occurs, thereby altering the contents of the event register 202. For example, an event may represent a request to enter into or exit from a power management sleep mode. Upon such an occurrence, the event register 202 sets the active low Event_Enable signal 204. Because the signal is not set as a result of a "power on" operation, or other operation causing a period of signal indeterminacy, the signal is deemed reliable.

As noted above, the Power_On_Reset signal 208 results from an application of power. As will be discussed further with reference to FIG. 3A, the Event_Enable signal 204 negotiates the delay circuit well before the Power_On_Reset signal 208 is applied to the context save circuit 200. Thus, the Event_Enable$_{Delay}$ signal 224 does not correspond to the Power_On_Reset signal 208 at the first AND gate 214 and the Master_Reset signal 212 is not set. The Minor_Reset signal 210 is active when the Master_Reset signal 212 is not active. Therefore, when the Power_On_Reset signal 208 and the Event_Enable$_{Delay}$ signal 224 do not correspond at the first AND gate 214, the signals do correspond at the second AND gate 218. The Event_

Enable$_{Delay}$ signal 224 is inverted before being gated with the Power_On_Reset signal 208. Thus, when the Event_Enable signal 204 is set prior to an application of power, the Minor_Reset signal 210 is active and the Master_Reset signal 212 is not active. The Event_Enable$_{Delay}$ signal 224, after passing through the inverting gate 216, corresponds to the Power_On_Reset signal 208 at the second AND gate 218. Therefore, when a reliable event has occurred, the context save circuit 200 passes the reset signal along the "event present" path through the second AND gate 218. Consequently, the Minor_Reset signal 210 is set and presented directly to an OR gate 220, bypassing the event register 202.

Figure 3A:
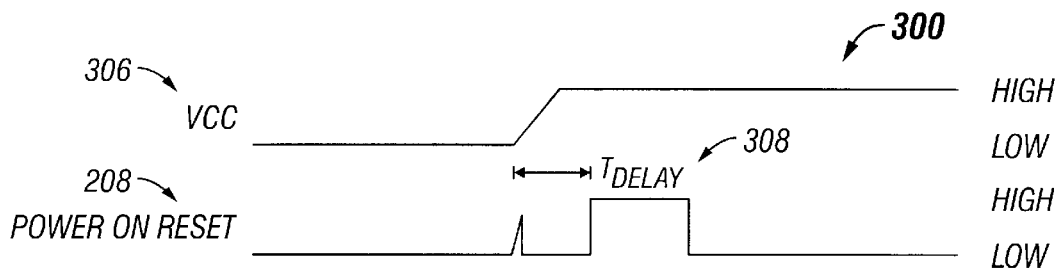
FIGS. 3A, 3B, and 3C are timing diagrams illustrative of the operation of the present invention.
Figure 3B:
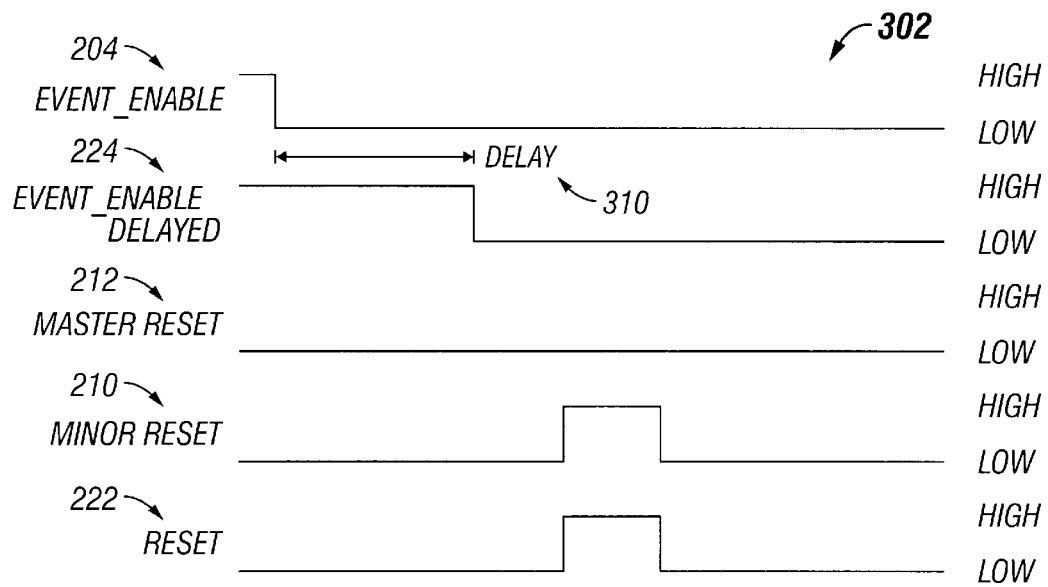
Figure 3C:
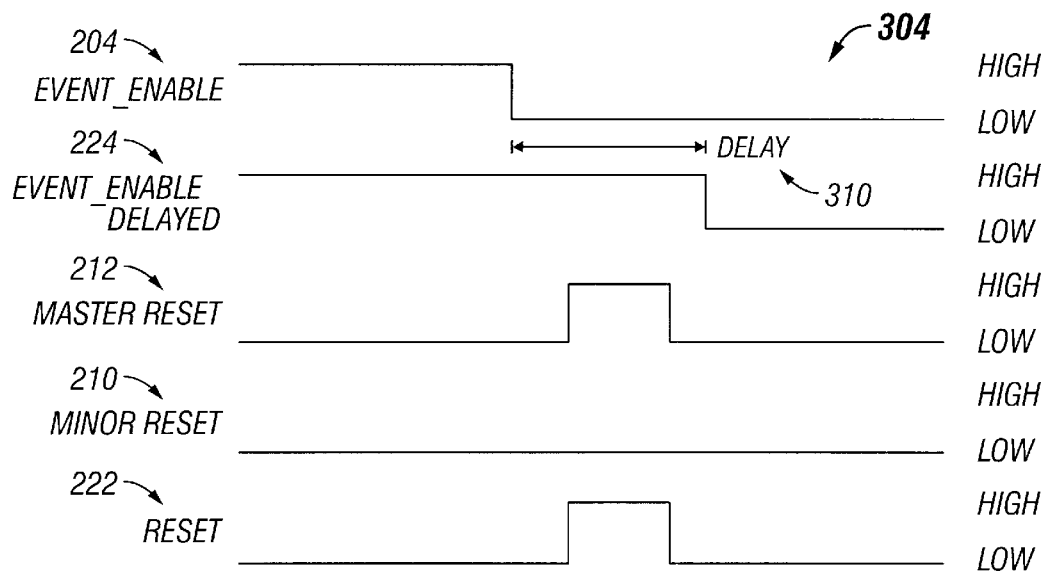

The Master_Reset signal 212 and the Minor_Reset signal 210 are both provided to the OR gate 220. A Reset signal 222 is thus produced by OR gate 220 when either of these reset signals are active. Since either the Master_Reset signal 212 or the Minor_Reset signal 210 is set upon an active Power_On_Reset signal 208, as shown in FIGS. 3A–3C, the Reset signal 222 shadows or follows the Power_On_Reset signal 208, having only a delay equal to the accumulated delay times for each of the negotiated logic gates 214–220. The OR gate 220 passes either the Master_Reset signal 212 or the Minor_Reset signal 210, one of which is active upon assertion of the Power_On_Reset signal 208. If the Power_On_Reset signal 208 has not been asserted, neither the Master_Reset signal 212 nor the Minor_Reset signal is set and the Reset signal 222, likewise, is not set. Therefore, the Reset signal 222 corresponds to the Power_On_Reset signal 208. The OR gate 220 simply passes the Power_On_Reset signal 208 to the rest of the system, to be applied, for example, to other system devices.

Turning now to FIGS. 3A–3C, shown are timing diagrams for the above-described signals for the context save circuit 200. According to the present invention, the context save circuit 200 can be used to bypass the system reset signal around the event register 202, thereby preserving the contents of that register when a reliable event has occurred. In one instance, a reliable event exists when it occurs prior to a "power up" operation. Therefore, FIGS. 3A–3C show the relationship between a power line, Vcc 306, and both reliable 302 and unreliable 304 event occurrences.

Turning specifically to FIG. 3A, during an application of power, a time period exists during which the system may be indeterminate until application of power has stabilized. Therefore, it is preferred that system signals be cleared or initialized after an application of power. Thus, the Power_On_Reset signal 208 is generally applied immediately after the power line has stabilized. A critical period, t$_{reset}$, indicated at 308, exists during which the Power_On_Reset signal 208 is not set and yet Vcc is ramping up. As such, during t$_{reset}$, system signals may be erroneously altered.

In FIG. 3B, a set of signals 302 is shown where a reliable event is present. In this case, the active low Event_Enable signal 204 is set prior to an application of Vcc 306. From FIG. 2, the Event_Enable signal 204 passes through the delay circuit 206, where the signal is held for a predetermined delay as indicated at 310. The delay time 310 must greater than the reset delay time tenet 308. Since the Event_Enable signal 204 occurs prior to the application of Vcc 306, such signal negotiates the delay circuit 206 well before the application of the Power_On_Reset signal 208 to the context save circuit 200. It should be noted that the "event present" timing diagram 302 is a compressed time scale version of typical event occurrences, as generally the Event_Enable signal 204 has been set in a wholly different state, well before a power up operation. In this way, the transition of the Event_Enable$_{Delay}$ signal 224 is shown much closer to power up operation than will typically occur.

When presented to the first AND gate 214, the reliable Event_Enable$_{Delay}$ signal 224 and the Power_On_Reset signal 208 do not correspond. Thus, the Master_Reset signal 212 is not set and the event register 202 is thereby not initialized or reset. However, the second AND gate 218 receives the Power_On_Reset signal 208 and the inverted Event_Enable$_{delay}$ signal 312. The signals correspond at the AND gate 218 and the Minor_Reset signal 210 is set. Therefore, when a reliable event is present, a reset signal is generated by the context save circuit 200 but does not reset the event register 202.

In FIG. 3C, a set of signals 304 is shown occurring when an unreliable event occurs. For example, the contents of the event register 202 are altered as a result of an application of Vcc 306. In this case, the Event_Enable signal 204 is driven low within the indeterminate period during the application of Vcc 306. The Event_Enable signal 204 then is presented to the delay circuit 206, but is not able to negotiate the delay 310 before an application of the Power_On_Reset signal 208. In this way, the Event_Enable$_{Delay}$ signal 224 corresponds with the Power_On_Reset signal 208 when presented to the first AND gate 214. The Master_Reset signal 212 is then set and applied to the event register 202. The Master_Reset signal 212 then resets or initializes the contents of the event register 202. It should also be noted that this "event not present" path is taken, and the Master_Reset signal 212 similarly resets or initializes the event register 202, when the Event_Enable signal 204 is not set at all. Therefore, when an event is not present or an unreliable event has occurred, for example as a result of an application of power, the Power_On_Reset signal 208 corresponds with the Event_Enable$_{Delay}$ signal 224 when presented at the first AND gate 214. The Master_Reset signal 212 is then set and applied to reset or initialize the contents of the event register 202.

It should be noted from FIGS. 3A–C that the Reset signal 222 matches the value of the Power_On_Reset signal 208. This is so because either the Master_Reset signal 212 or the Minor_Reset signal 210 is always set as a result of a Power_On_Reset signal 208.

The foregoing disclosure and description of the invention are illustrative and explanatory thereof, and various changes in the size, shape, materials, components, circuit elements, wiring connections and contacts, as well as in the details of the illustrated circuit and construction and method of operation may be made without departing from the spirit of the invention.

What is claimed is:

1. A method of preserving a state of an event in a computer system, the state of the event represented by an event signal, the computer system being subject to a reset signal, the method comprising the steps of;

(a) resetting the state of the event if the event signal was erroneously set as a result of a present application of power to the computer system; and (b) preserving the state of the event when the event signal is asserted as a result of a request by the computer system to alter the event;

wherein step (a) further comprises the steps of:
(1) delaying the event signal;
(2) asserting the reset signal after the present application of power;
(3) applying the reset signal to the event.

2. The method of claim 1, wherein during the delay step, the event signal is delayed for a time longer than a time between the application of power to the computer system and the assertion of a reset signal.

3. The method of claim 1 wherein the step of preserving further comprises the step of:

protecting the event from the reset signal, such that the state of the event remains unchanged.

4. A circuit apparatus comprising:

a delay circuit to delay an event signal for a time sufficient to allow a reset signal to reset the state of an event if unreliable; and a set of logical steering gates to receive the event signal and a reset signal, the output of the steering gates being a second reset signal, the second reset signal applying the event signal when the event signal is set as the result of a present application of power, the reset signal bypassing the event signal when the event signal is set prior to a present application of power.

5. A method of preserving the state of an event signal in a computer system during a power up reset sequence based on the state of the event signal, the method comprising the steps of:

(a) delaying the event signal, said delay being longer than a time between application of power to the computer system and assertion of a reset signal, (b) comparing the delayed event signal to the reset signal; and (c) resetting the event signal only if the state of the event signal corresponds to the state of the reset.

6. The apparatus of claim 4, wherein:

the event is a request by a processor to alter a state of a computer system.

7. The apparatus of claim 4, further comprising:

a storage device containing a region for storing event information relating to an occurrence of an event;

the reset signal being capable of resetting the stored event information.

8. The apparatus of claim 7, wherein the storage device is an external hard drive.

9. The apparatus of claim 4, wherein:

the delay circuit further comprises a path for providing the reset signal as an output for the circuit.

10. The apparatus of claim 4, wherein:

the delay circuit delays the event signal for a predetermined period.

11. The apparatus of claim 4, further comprising:

an event register containing event information required to alter the state of computer system operation.

* * * * *